(12) United States Patent
Lee et al.

(10) Patent No.: US 11,525,202 B2
(45) Date of Patent: Dec. 13, 2022

(54) AI-BASED LAUNDRY COURSE RECOMMENDING APPARATUS AND METHOD OF CONTROLLING THE SAME

(71) Applicant: LG ELECTRONICS INC., Seoul (KR)

(72) Inventors: Jooseong Lee, Seoul (KR); Taeyup Song, Seoul (KR); Dayun Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 564 days.

(21) Appl. No.: 16/603,815

(22) PCT Filed: Jun. 28, 2019

(86) PCT No.: PCT/KR2019/007929
§ 371 (c)(1),
(2) Date: Oct. 8, 2019

(87) PCT Pub. No.: WO2020/262746
PCT Pub. Date: Dec. 30, 2020

(65) Prior Publication Data
US 2021/0363680 A1 Nov. 25, 2021

(51) Int. Cl.
*D06F 34/18* (2020.01)
*G06T 7/11* (2017.01)
(Continued)

(52) U.S. Cl.
CPC ............. *D06F 34/18* (2020.02); *D06F 34/28* (2020.02); *G05B 13/027* (2013.01);
(Continued)

(58) Field of Classification Search
CPC ...... D06F 34/18; D06F 34/28; D06F 2103/06; D06F 34/05; D06F 2103/00;
(Continued)

(56) References Cited

U.S. PATENT DOCUMENTS

| 2016/0222577 A1 | 8/2016 | Ashrafzadeh et al. |
| 2017/0009390 A1 | 1/2017 | Suh et al. |

(Continued)

FOREIGN PATENT DOCUMENTS

| KR | 1020080079913 | 9/2008 |
| KR | 1020150105844 | 9/2015 |

(Continued)

OTHER PUBLICATIONS

CN109112774 Deng et al (Year: 2019).*

(Continued)

*Primary Examiner* — Jianxun Yang
(74) *Attorney, Agent, or Firm* — Lee, Hong, Degerman, Kang & Waimey PC (57) ABSTRACT

Disclosed is an artificial intelligence (AI)-based self-control air conditioner. The AI-based self-control air conditioner includes a communication unit configured to receive an image including member data for identifying the member from an image acquisition apparatus corresponding to a group including at least one member, and a processor configured to recognize the member data from the received image, to acquire operation data including an operation condition of an air conditioner, which is desired by the member, based on the recognized data, to store member information including the member data and the operation data in a database, and to acquire and analyze the operation condition of the air conditioner, which is desired by the member, with respect to at least one member from a plurality of pieces of member information corresponding to the group stored in the database, wherein the air conditioner is autonomously driven according to control of the processor. Accordingly, the air conditioner learns members itself and controls an operation in an optimum state to reduce power consumption and is driven according to an operation condition set for (Continued)

each member to enhance personal convenience of the member.

15 Claims, 7 Drawing Sheets

(51) Int. Cl.
  *D06F 34/28* (2020.01)
  *G05B 13/02* (2006.01)
  *G06K 9/62* (2022.01)
  *G06N 3/04* (2006.01)
  *D06F 103/06* (2020.01)

(52) U.S. Cl.
  CPC ......... *G06K 9/6215* (2013.01); *G06N 3/0427* (2013.01); *G06T 7/11* (2017.01); *D06F 2103/06* (2020.02); *G06T 2207/20081* (2013.01); *G06T 2207/20084* (2013.01)

(58) Field of Classification Search
  CPC ............. D06F 2103/04; D06F 2103/64; D06F 2105/10; D06F 2105/52; D06F 33/32; D06F 2101/20; G05B 13/027; G05B 15/02; G05B 2219/2633; G06K 9/6215; G06K 9/6267; G06N 3/0427; G06N 3/0454; G06N 3/08; G06T 7/11; G06T 2207/20081; G06T 2207/20084; G06V 10/82; G06V 20/52; H04N 5/225
  See application file for complete search history.

(56) References Cited

U.S. PATENT DOCUMENTS

| | | | |
|---|---|---|---|
| 2018/0127910 A1* | 5/2018 | Xu | ............................ D06F 33/36 |
| 2018/0308149 A1* | 10/2018 | Guo | ..................... G06N 3/0454 |
| 2019/0302091 A1 | 10/2019 | Kessler et al. | |

FOREIGN PATENT DOCUMENTS

| | | |
|---|---|---|
| KR | 1020170090164 | 8/2017 |
| KR | 1020170138559 | 12/2017 |
| KR | 1020180119486 | 11/2018 |
| KR | 1020190029676 | 3/2019 |

OTHER PUBLICATIONS

CN105002698 Gao (Year: 2015).*
PCT International Application No. PCT/KR2019/007929, Written Opinion of the International Searching Authority dated Mar. 26, 2020, 10 pages.

* cited by examiner

AI-BASED LAUNDRY COURSE RECOMMENDING APPARATUS AND METHOD OF CONTROLLING THE SAME

CROSS-REFERENCE TO RELATED APPLICATIONS

This application is the National Stage filing under 35 U.S.C. 371 of International Application No. PCT/KR2019/007929, filed on Jun. 28, 2019, the contents of which are hereby incorporated by reference herein in its entirety.

FIELD

The present invention relates to an artificial intelligence (AI)-based laundry course recommending apparatus and a method of controlling the same.

BACKGROUND

Artificial intelligence (AI) refers to one field of computer engineering and information technology of studying a method for making a computer think, learn, and do self-improvement, which is achieved based on human intelligence, and means that a computer emulates an intelligent behavior of the human.

Artificial intelligence is largely related directly and indirectly to other fields of a computer science rather than existing itself. In particular, artificial intelligent elements have been modernly introduced in various fields of information technology, and there has been an active attempt to use AI to overcome problems of the fields.

Recently, there has been an attempt to apply technology for applying AI to home appliance and managing the home appliance according to various purposes. Home appliance that is automatically programmed for the purpose is controlled without human intervention. For example, a washing machine to which AI is applied automatically provides a laundry course that is appropriate for a type of laundry to allow a user to easily select the laundry course.

In this regard, Korean Patent Publication No. 10-2008-0079913 (Method of recommending laundry course of washing machine, hereinafter, 'Cited Reference 1') discloses a method of recommending an optimum laundry course according to a type of laundry to allow a user to easily select a laundry course appropriate for the type of laundry.

Korean Patent Publication No. 10-2018-0119486 (a laundry processing apparatus, a method of controlling the same, and an on-line system including the laundry processing apparatus, for learning patterns of a course and option performed by a user through AI and recommending a customized course and option, hereinafter, 'Cited Reference 2') discloses a laundry processing apparatus, a method of controlling the same, and an on-line system including the laundry processing apparatus, which applies a user history or regional information to recommend one or more of the customized course or option to a user.

However, in Cited Reference 1, users are not capable of accurately recognizing a type of laundry because they have to check the type of laundry by themselves, and in Cited Reference 2, there is a problem in that it is not possible to manipulate courses except for a course matched with a learning model because a course based on the past learning model is recommended.

SUMMARY

An object of the present invention devised to solve the problem lies in an artificial intelligence (AI)-based laundry course recommending apparatus for automatically analyzing a type of laundry without subjective determination of a user to provide a laundry course, and a method of controlling the same.

Another object of the present invention is provision of an artificial intelligence (AI)-based laundry course recommending apparatus for providing a matched laundry course by immediately analyzing input laundry, but not a learning model.

In an aspect of the present invention, an artificial intelligence (AI)-based laundry course recommending apparatus includes a detector configured to classify at least one laundry inside a washing machine into a plurality of regions and to photograph the plurality of regions at a plurality of angles, respectively, to acquire at least one image related to a type and a material of the laundry, and a processor configured to acquire laundry information on the type and material of the laundry from the image, to store the laundry information in a database, and to compare a plurality of pieces of laundry information corresponding to the plurality of regions, which is stored in the database, with laundry data and laundry course pre-input by a user, and to extract a laundry course of the at least one laundry.

The detector may further include a camera configured to photograph the plurality of regions of the laundry at a plurality of angles, respectively, and a lighting configured to provide a light source to acquire the image during photograph of the camera.

The lighting may be installed on an upper portion of the washing machine to maintain predetermined illumination in the laundry distributed on the plurality of regions, and may be operated while the detector acquires the image.

In some embodiments, the processor may extract at least one laundry course to be applied to the laundry information, may apply a score to suitability of the laundry information and the at least one laundry course, and may extract a laundry course with a highest score.

In some embodiments, the processor may classify the laundry information distributed on the plurality of regions, may compare the laundry information with the laundry data to calculate similarity therebetween, and may extract a laundry course corresponding to laundry data with a highest similarity.

In some embodiments, the processor may extract the plurality of regions from the image, may infer the laundry information through a convolutional neural network (CNN) of the laundry distributed on the plurality of regions, and may extract a pre-learned laundry course corresponding to the laundry information.

In some embodiments, a memory may be is learned using a machine learning or deep learning algorithm and may be used to recognize the laundry information from the image.

In some embodiments, the processor may further include a controller configured to control the washing machine according to any one of a laundry course that is manually input by the user or a laundry course that is automatically extracted.

In another aspect of the present invention, a control method of an artificial intelligence (AI)-based laundry course recommending apparatus includes a first operation of classifying at least one laundry inside a washing machine into a plurality of regions and photographing the plurality of regions at a plurality of angles, respectively, to acquire at least one image related to a type and a material of the laundry, a second operation of acquiring laundry information on the type and material of the laundry from the image and storing the laundry information in a database, and a third operation of comparing a plurality of pieces of laundry information corresponding to the plurality of regions, which is stored in the database, with laundry data and laundry course pre-input by a user, and extracting a laundry course of the at least one laundry.

In some embodiments, the first operation may include receiving at least one still image or video image indicating the type and material of the laundry from the user or a mobile device of the user.

In some embodiments, the second operation may include classifying the laundry into the plurality of regions, generating laundry information by matching with a type and a material corresponding to the plurality of regions, and storing a result in the database by matching the laundry and the laundry information corresponding to the plurality of regions.

In some embodiments, the third operation may include extracting at least one laundry course to be applied to the laundry information, applying a score to suitability of the laundry information and the at least one laundry course, and extracting a laundry course with a highest score.

In some embodiments, the third operation may include classifying the laundry information distributed on the plurality of regions, comparing the laundry information with the laundry data to calculate similarity therebetween, and extracting a laundry course corresponding to laundry data with a highest similarity.

In some embodiments, the third operation may include applying a convolutional neural network (CNN) of the laundry distributed on the plurality of regions to infer the laundry information, and extracting a pre-learned laundry course corresponding to the laundry information.

The method may further include controlling the washing machine according to any one of a laundry course that is manually input by the user or a laundry course that is automatically extracted.

DETAILED DESCRIPTION

Hereinafter, the present invention will be described in detail by explaining exemplary embodiments of the invention with reference to the attached drawings. The same reference numerals in the drawings denote like elements, and a repeated explanation thereof will not be given. The suffixes "module" and "unit" of elements herein are used for convenience of description and thus can be used interchangeably and do not have any distinguishable meanings or functions. In the description of the present invention, certain detailed explanations of related art are omitted when it is deemed that they may unnecessarily obscure the essence of the invention. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

It will be understood that, although the terms first, second, third etc. may be used herein to describe various elements, these elements should not be limited by these terms. These terms are only used to distinguish one element from another element.

It will be understood that when an element is referred to as being "on", "connected to" or "coupled to" another element, it may be directly on, connected or coupled to the other element or intervening elements may be present. In contrast, when an element is referred to as being "directly on," "directly connected to" or "directly coupled to" another element or layer, there are no intervening elements present.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

Figure 1:
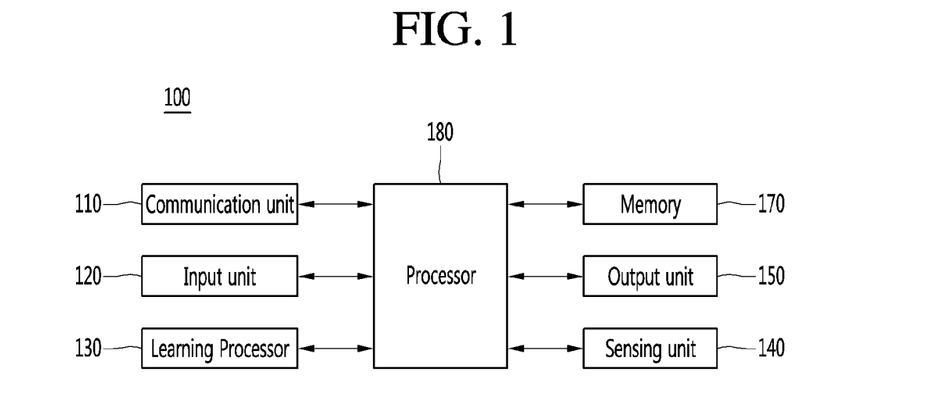
FIG. 1 illustrates an artificial intelligence (AI) device according to an embodiment of the present invention.

FIG. 1 Illustrates an AI Device 100 According to an Embodiment of the Present Invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100*a* to 100*e* and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
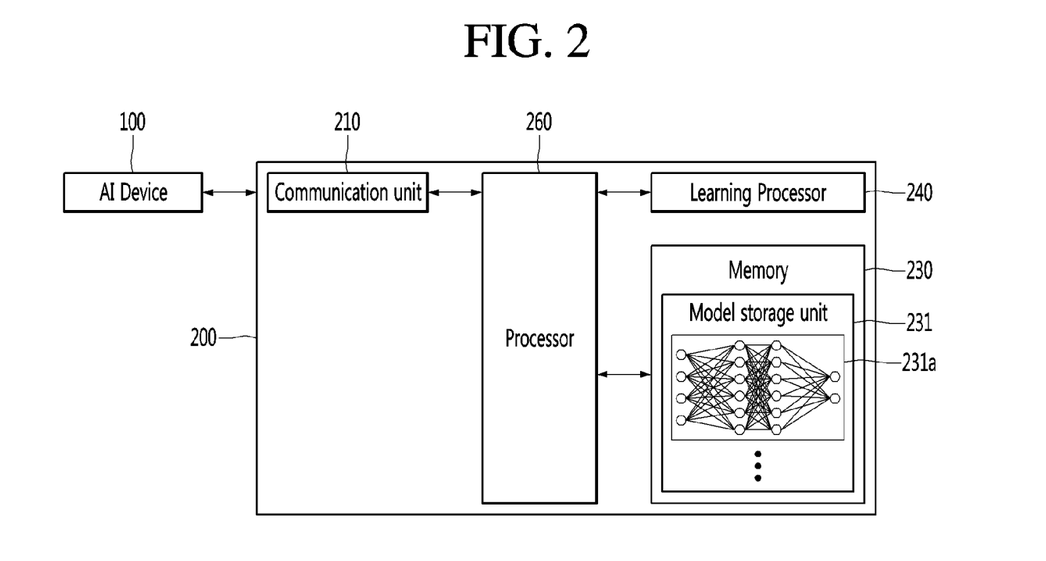
FIG. 2 illustrates an AI server according to an embodiment of the present invention.

FIG. 2 Illustrates an AI Server 200 According to an Embodiment of the Present Invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
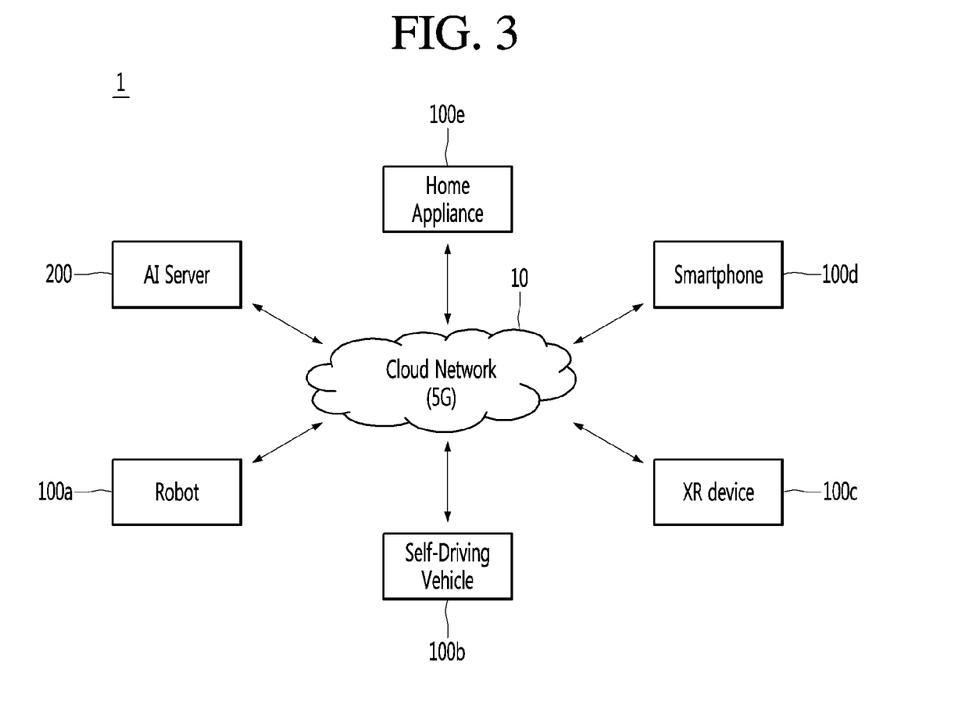
FIG. 3 illustrates an AI system according to an embodiment of the present invention.

FIG. 3 Illustrates an AI System 1 According to an Embodiment of the Present Invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/ interaction of the user. At this time, the robot 100a may acquire the intention information of the interaction due to the user's operation or speech utterance, and may determine the response based on the acquired intention information, and may perform the operation.

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
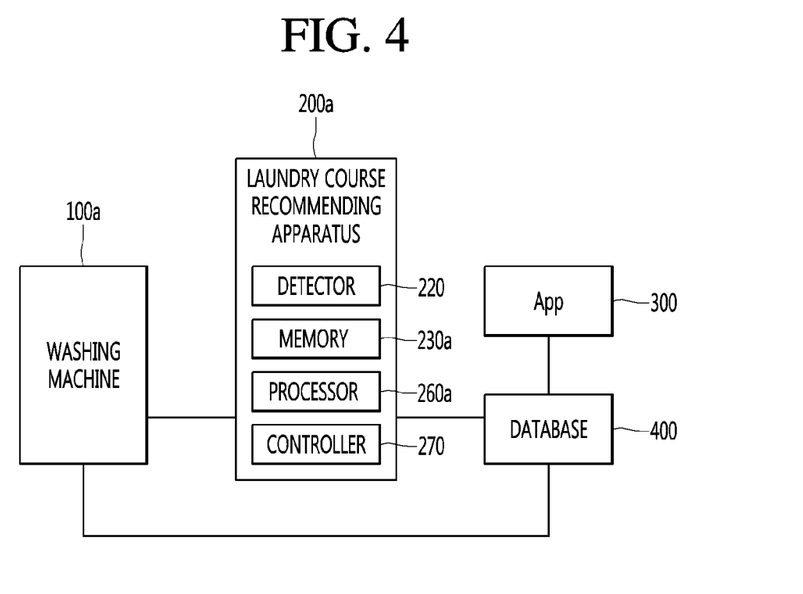
FIG. 4 is a block diagram of an AI-based laundry course recommending apparatus according to an embodiment of the present invention.

FIG. 4 is a block diagram of an AI-based laundry course recommending apparatus 200a according to an embodiment of the present invention.

Referring to FIG. 4, the AI-based laundry course recommending apparatus 200a may include a detector 220, a memory 230a, a processor 260a, and a controller 270.

The AI-based laundry course recommending apparatus 200a may correspond to an example of the AI server 200 described above with reference to FIG. 2. That is, the components 210, 230, 240, and 260 included in the AI server 200 of FIG. 2 may also be included in the AI-based laundry course recommending apparatus 200a.

A washing machine 100a may correspond to an example of the AI device 100 of FIG. 2. That is, the components 110, 120, 130, 140, 150, 170, and 180 included in the AI device 100 of FIG. 1 may also be included in the washing machine 100a.

The AI-based laundry course recommending apparatus 200a may recognize laundry information related to the laundry characteristics through an image recognition model (e.g., the artificial neural network 231a) based on machine learning, which is learned by the learning processor 240, from an image acquired from the detector 220.

The detector 220 may classify at least one laundry inside the washing machine 100a into a plurality of regions and may photograph the plurality of regions at a plurality of angles, respectively, to acquire at least one image related to the type and material of the laundry.

When a user puts laundry into the washing machine 100a, if various laundries are mixed, the detector 220 may analyze the laundries. Because the laundries have fabric patterns, the laundries are classified according to the materials, shapes, and the like of the fabric pattern, and how to do wash according to the laundries may be determined.

When laundry has a plurality of fabric patterns, the detector 220 may cluster images of laundries that are respectively present in a plurality of regions and may detect each fabric pattern.

Detection of the fabric pattern may be used to determine a type of fabric such as cotton, cotton wool, leather, and polyester and may be a reference for classification of corresponding laundry. Basic information may include color, a design, a pattern, a material, whether fabric is decolorized, a type, a weight, a style, an optimum washing temperature, whether wash is requested, or a brand.

The memory may store a laundry data recognition model that is learned using a machine learning or a deep learning algorithm and is used to recognize the laundry data from the image.

The memory of the AI-based laundry course recommending apparatus 200a may store a laundry data recognition model 231b (e.g., an image recognition model) learned by the learning processor 240 or a processor 260a.

For example, the learning processor 240 or the processor 260a may learn the laundry data recognition model 231b through map learning using an image for learning and laundry information for learning.

The processor may acquire laundry information on the type and material of the laundry from the image and may store the laundry information in a database 400.

The processor may compare a plurality of pieces of laundry information corresponding to the plurality of regions, which is stored in the database 400, with laundry data and laundry course pre-input by a user and may extract a laundry course of the at least one laundry.

The laundry information may define the type and material of laundry, may be a reference for classifying the laundry like the aforementioned fabric pattern, and may include, for example, a blouse, a running shirt, a cotton-wool comforter, or leather.

The laundry information may record a fabric pattern and classification information of corresponding laundry and laundry information may be labeled on at least one laundry recognized in a plurality of regions and may be stored in the database 400.

The processor may classify the laundry information distributed on the plurality of regions, may compare the laundry information with the laundry data to calculate similarity therebetween, and may extract a laundry course corresponding to laundry data with the highest similarity.

The laundry data may have the same configuration as the laundry information, but may be defined as input by a user, but not automatically recognized information. That is, the laundry data may be information to be input on all fabric patterns when a user drives the washing machine 100a and may refer to information that is input by the user prior to recognition of the detector 220.

The laundry data may not be applied when the processor personally infers the laundry information through a learning algorithm and may be used in a procedure of comparing and determining images acquired by the detector 220 and calculating similarity.

The processor may extract at least one laundry course to be applied to the laundry information, may apply a score to suitability of the laundry information and the at least one laundry course, and may extract a laundry course with the highest score.

The processor may extract the plurality of regions from the image, may infer the laundry information through a convolutional neural network (CNN) of the laundry distributed on the plurality of regions, and may extract a pre-learned laundry course corresponding to the laundry information.

The convolutional neural network (CNN) is learning based recognition technology that is precise technology for determining the plurality of regions and classifying detected laundries.

The convolutional neural network (CNN) is a model obtained by copying a brain function of the human under the assumption that the basic features of an object are extracted, complicated calculation is performed in the brain, and then the object is recognized based on the result when the human recognizes an object.

The processor according to an embodiment of the present invention may use learning based recognition technology that is technology based on deep learning of clustering or classifying a plurality of data by a learning structure designed to accurately classify laundries.

The controller 270 may control the washing machine 100a according to any one of a laundry course that is manually input by the user or a laundry course that is automatically extracted by the processor.

The controller 270 may be operatively associated with the database 400 or may be operatively associated directly with the washing machine 100a. With regard to course selection, the controller 270 may prioritize the laundry course that is manually input by the user and the laundry course that is automatically extracted by the processor, may control the washing machine 100a, and may be physically embodied like a manipulation button having a control function.

Figure 5:
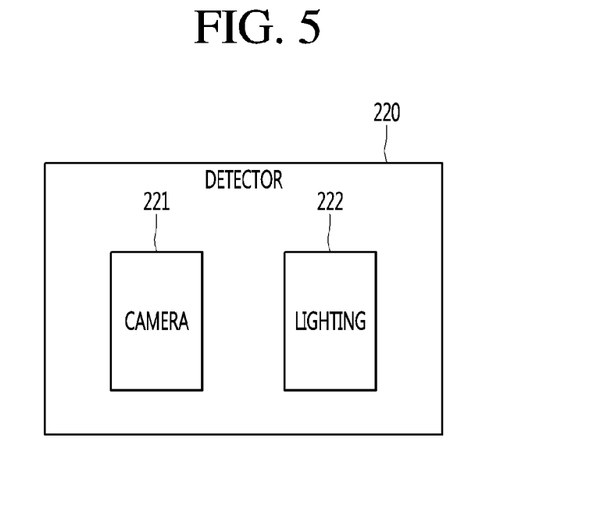
FIG. 5 is a diagram showing a configuration of a detector according to an embodiment of the present invention.

FIG. 5 is a diagram showing a configuration of the detector 220 according to an embodiment of the present invention.

Referring to FIG. 5, the detector 220 may further include a camera 221 and a lighting 222.

The camera 221 may photograph a plurality of regions of the laundries at a plurality of angles, respectively. The camera 221 may be a camera for identifying a target object through image recognition and may include a three-dimensional camera (3D) or the like, which is capable of extracting an image or a video image.

The camera 221 may be installed on a laundry bucket inside the washing machine 100a or may be installed on a frame outside the laundry bucket and may be positioned at any position for recognizing laundry.

The lighting 222 may provide a light source to acquire the image during photograph of the camera 221. The lighting 222 may be installed on an upper portion of the washing machine 100a in order to maintain predetermined illumination in the laundry distributed on the plurality of regions and may be operated while the detector 220 acquires the image.

The camera 221 may transmit the acquired image to the processor periodically or in real time, or may extract a specific video image or may extract an image of video data in the form of an image and may transmit the extracted image.

When is not capable of analyzing the laundries based on the image acquired from the plurality of regions, the camera 221 may re-acquire an image by the processor according to a preset reference.

A control method of recommending a laundry course using the aforementioned AI-based laundry course recommending apparatus 200a will be described below.

Figure 6:
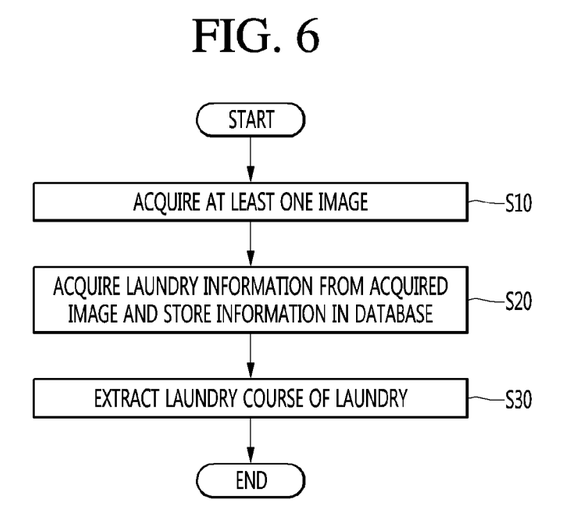
FIG. 6 is a flowchart of a control method of an AI-based laundry course recommending apparatus according to an embodiment of the present invention.

FIG. 6 is a flowchart of a control method of the AI-based laundry course recommending apparatus 200a according to an embodiment of the present invention.

Referring to FIG. 6, the control method according to the present invention may include a first operation S10 to a third operation S30, which includes the first operation S10 of acquiring at least one image, a second operation S20 of acquiring laundry information from the acquired image and storing the laundry information in the database 400, and the third operation S30 of extracting a laundry course of laundry.

In the first operation S10, at least one laundry inside the washing machine 100a may be classified into a plurality of regions, the plurality of regions may be photographed at a plurality of angles, respectively, and at least one image of a type and material of the laundry may be acquired.

The first operation S10 may include receiving at least one still image or video image indicating the type and material of the laundry from the user or a mobile device 300 of the user.

The first operation may be embodied through the camera 221 and the lighting 222. At least one camera 221 may be installed, and the camera 221 may acquire a plurality of images in order to acquire an image for identifying laundry.

The camera 221 may acquire a plurality of images of a plurality of regions, respectively, and it is possible to adjust an angle of the camera 221, and thus the camera 221 may photograph laundry as a subject to detect an image at various angles.

In addition to the case in which the camera 221 is applied, the user may directly input a still image or a video image. In this case, in some embodiments, the image may be input through an external input device installed in the washing machine 100a or may also be transmitted via access to the washing machine 100a using wireless communication. When the user directly inputs a still image or a video image, a recognition procedure of the camera 221 may be omitted.

Figure 7:
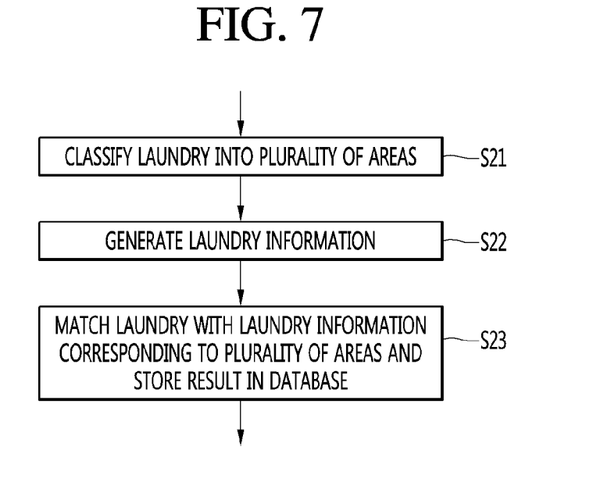
FIG. 7 is a detailed flowchart of the second operation according to an embodiment of the present invention.

FIG. 7 is a detailed flowchart of the second operation according to an embodiment of the present invention.

Referring to FIG. 7, the second operation S20 may be a procedure of acquiring laundry information on the material and material of the laundry from the image and storing the laundry information in the database 400, and may include operation S21 of classifying laundry into a plurality of regions, operation S22 of generating the laundry information, and operation S23 of matching the laundry and laundry information corresponding to the plurality of regions and storing the result in the database 400.

Operation S21 of classifying laundries into the plurality of regions may be a preparation procedure of dividing a part in which laundries are positioned and matching images based on the respective laundries.

Operation S22 of generating the laundry information may be a procedure of generating a fabric pattern of corresponding laundry of laundries present in the plurality of regions, and classification information.

In this case, the processor may configure laundry information of the laundries through the image transmitted from the camera 221 of the detector 220 and may store the laundry information in the database 400 (S23). As described above, the laundry information may define the type and material of laundry and may be a reference for classifying the laundry like the aforementioned fabric pattern. A detailed configuration of the second operation according to an embodiment of the present invention will be described below with reference to FIG. 7.

In the third operation S30, a plurality of pieces of laundry information corresponding to the plurality of regions, which are stored in the database 400 and may be compared with laundry data and laundry course that are pre-input by the user to extract the at least one laundry course of the laundry.

The third operation S30 may be a procedure of comparing a plurality of images transmitted from the detector 220 by the processor with the laundry data and laundry course in the database 400, which are pre-input by the user, of checking basic information of each laundry, and extracting the most optimum laundry course from the basic information.

Basic information may mainly include color, a design, a pattern, a material (which includes cotton, linen, chemical fiber, polyester, silk, down, denim, or the like), whether fabric is decolorized, a type (which includes underwear, coat, pants, children's wear, a bed sheet, a blanket cover, or the like), a weight, a style, an optimum washing temperature, whether wash is requested, and/or a brand without being limited thereto, and may be used as a reference for determining a washing program in the future.

The third operation S30 may be embodied a first embodiment (refer to FIG. 8) of extracting a laundry course via comparison between the laundry information and each laundry course and a second embodiment (refer to FIGS. 9 and 10) of determining similarity with laundry data input by a user and extracting a laundry course.

Figure 8:
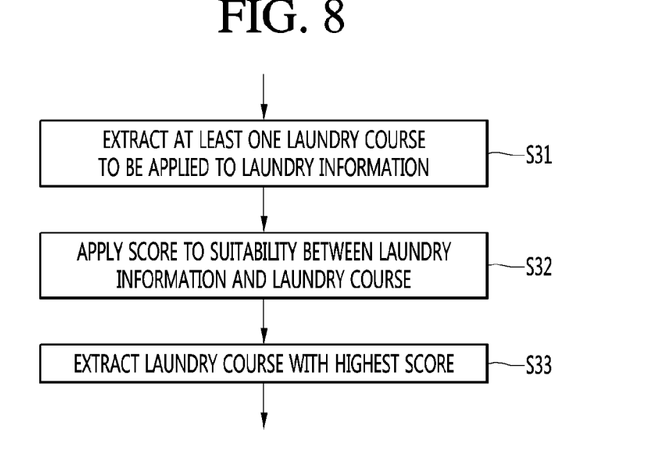
FIG. 8 is a detailed flowchart of a third operation according to a first embodiment of the present invention.

FIG. 8 is a detailed flowchart of a third operation according to a first embodiment of the present invention.

Referring to FIG. 8, the third operation S30 according to the first embodiment may include operation S31 of extracting at least one laundry course that is applicable to laundry information, operation S32 of applying a score to suitability between laundry information and the laundry course, and operation S33 of extracting a laundry course with the highest score.

TABLE 1

|  | Blouse | Running shirt | Cotton-wool comforter | Jacket |
| --- | --- | --- | --- | --- |
| Standard | −5 | 0 | −25 | −100 |
| Wool/Delicate | −3 | −20 | −40 | −100 |
| Rapid | −25 | −15 | −25 | −100 |
| Blanket | −90 | −5 | 0 | −100 |
| Underwear | −75 | 0 | −20 | −100 |

Table 1 above shows the case in which laundry information (the horizontal axis) and a laundry course (the vertical axis) are matched with each other and a score is applied to suitability.

As shown in Table 1 above, in operation S31 of extracting at least one laundry course that is applicable to laundry information, laundry information labeled on the laundry may be extracted, and a course that is not applicable to the laundry information may be excluded.

For example (not shown in Table), when it is not possible to apply the standard or rapid course to product A with respect to laundry information on laundry A, the standard and rapid courses may be excluded when suitability with a course is excluded. When a user puts laundries that are not capable of being washed together, the method may also include an operation of excluding all laundry courses and notifying a user of this.

In operation S32 of applying a score to suitability between laundry information and the laundry course, in Table 1 above, the course and underwear courses are appropriate for a running shirt, and thus suitability is 0, and in contrast, other laundry courses have a difference corresponding thereto, and thus (−) may be indicated.

The operation of extracting the laundry course with the highest score may be a procedure of extracting the laundry course with the highest score and notifying a user of this or displaying this on the washing machine 100a.

Figure 9:
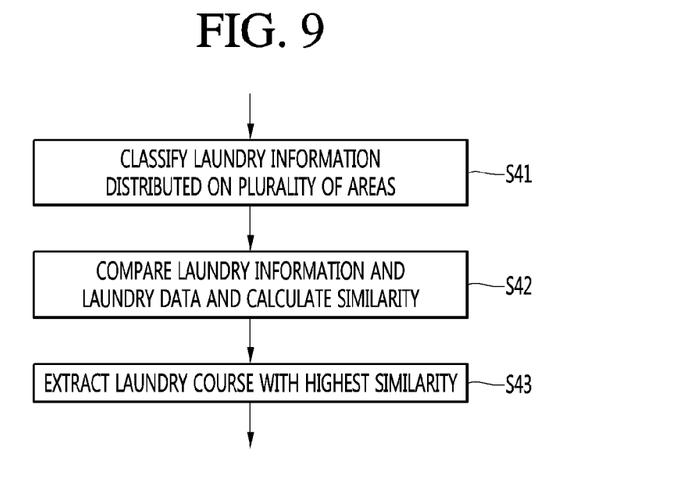
FIG. 9 is a detailed flowchart of the third operation according to the second embodiment of the present invention.
Figure 10:
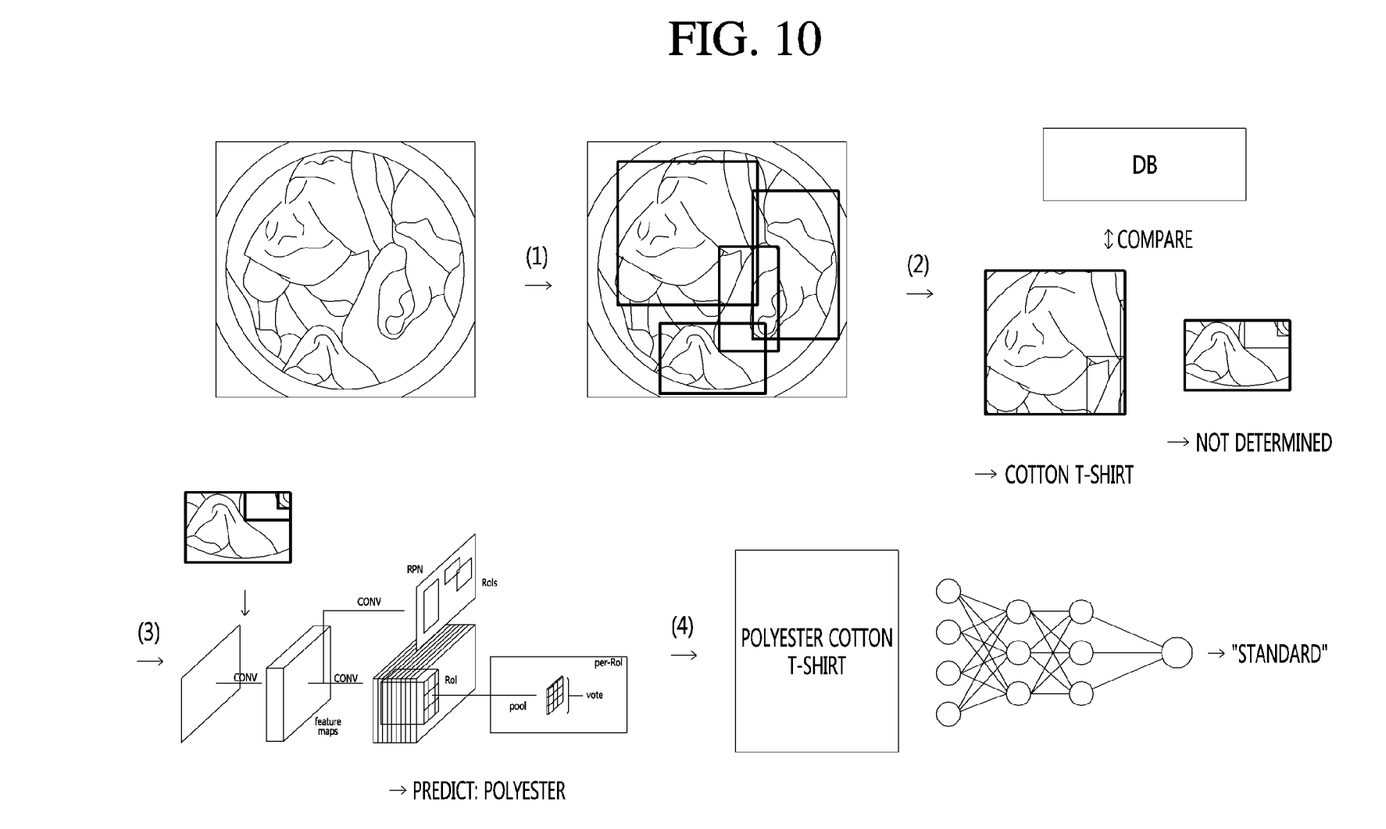
FIG. 10 shows the case in which a laundry course of a processor illustrated in FIG. 9 is extracted.

FIG. 9 is a detailed flowchart of the third operation S30 according to the second embodiment of the present invention. FIG. 10 shows the case in which a laundry course of a processor illustrated in FIG. 9 is extracted.

Referring to FIG. 9, the third operation S30 according to the second embodiment may include operation S41 of classifying the laundry information distributed on a plurality of regions, operation S42 of comparing laundry information and laundry data to calculate similarity, and operation S43 of extracting a laundry course with the highest similarity, and with reference to FIG. 10, the extracting operation is illustrated as procedures (1) to (4).

Operation S41 of classifying the laundry information may be procedure (2) of matching laundry with laundry information according to a type and a material (1) through a plurality of regions classified in the aforementioned first operation and at least one image present in each region.

Operation S42 of comparing laundry information and laundry data to calculate similarity may be procedure (3) of comparing each laundry with laundry data preregistered in the database 400 and then matching closest materials.

In this procedure, when the closest materials are not matched, (4) a convolutional neural network (CNN) of the laundry distributed on the plurality of regions may be applied to infer the laundry information or extract a pre-learned laundry course corresponding to the laundry information.

Operation S43 of extracting the laundry course with the highest similarity may be a procedure comparing laundry information with the pre-stored laundry data, matching the closest materials, and notifying a user of this or displaying this on the washing machine 100a.

Figure 11:
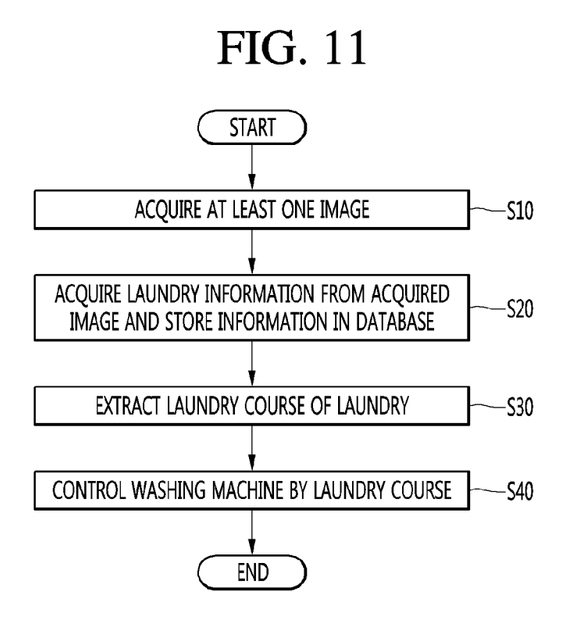
FIG. 11 is a flowchart to which a controller is added according to an embodiment of the present invention.
Figure 12:
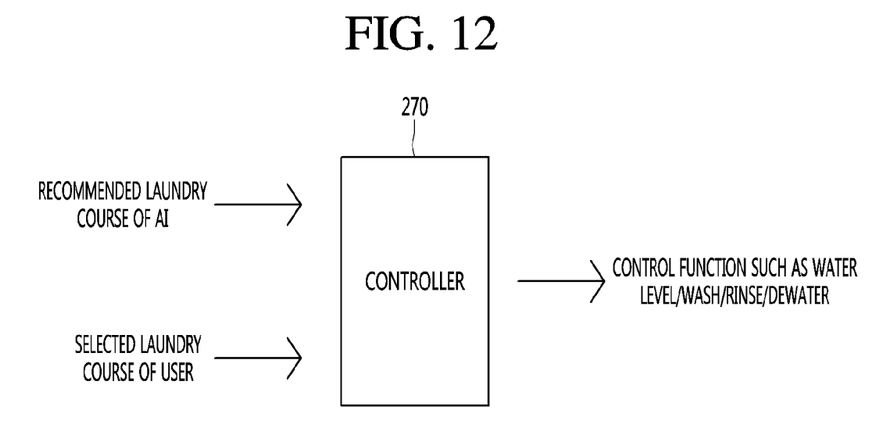
FIG. 12 shows the case of a controller for controlling a washing machine according to the flowchart of FIG. 11.

FIG. 11 is a flowchart to which the controller 270 is added according to an embodiment of the present invention. FIG. 12 shows the case of the controller 270 for controlling the washing machine 100a according to the flowchart of FIG. 11.

Referring to FIGS. 11 and 12, the controller 270 may be added to FIG. 4 above, and the washing machine 100a may be controlled by any one of the laundry course that is manually input by the user or an automatically extracted laundry course.

The controller 270 may include a communication module configured to communicate with the washing machine 100a using a wired communication such as serial communication or one communication method of local area wireless communication methods such as radio frequency (RF) communication, Bluetooth, infrared ray communication (IrDA), wireless LAN, or Zigbee, control information may be displayed directly on the washing machine 100a using the communication module or may be transmitted to the mobile device 300 of the user, and the washing machine 100a may also be controlled through a driving module.

According to an embodiment of the present invention, an artificial intelligence (AO-based laundry course recommending apparatus and a method of controlling the same may autonomously provide a laundry course appropriate for a user, and thus may advantageously acquire the most appropriate laundry method to laundry in terms of the user.

In addition, the artificial intelligence (AI)-based laundry course recommending apparatus and the method of controlling the same may drive a washing machine according to a type of laundry, and thus may effectively wash laundry in terms of a machine and may advantageously prevent cloth from being damaged in terms of laundry.

The above description is merely examples of exemplary embodiments of the present invention, and it will be understood by those skilled in the art that various changes in form and details may be made therein without departing from the spirit and scope of the invention as defined by the appended claims.

Accordingly, the exemplary embodiments of the present invention are for description of the exemplary embodiment of the present invention rather than limiting the features of the present invention, and the scope of the feature of the present invention is not limited by the exemplary embodiments.

It will be interpreted that the scope of the present invention is understood by the following claims and all features fall within equivalents of the scope of the present invention.

What is claimed is:

1. An artificial intelligence (AI)-based laundry course recommendation apparatus comprising:
    a detector configured to classify at least one laundry item inside a washing machine into a plurality of regions and to photograph the plurality of regions at a plurality of angles, respectively, to acquire at least one image related to a type and a material of the at least one laundry item;
    a database configured to store laundry data and laundry course corresponding to the laundry data, wherein the laundry course is input by a user; and
    a processor configured to:
    acquire the at least one image from the detector,
    classify a plurality of pieces of laundry information on the type and material of the at least one laundry item from the at least one image,
    store the laundry information in the database,
    compare the laundry information with the laundry data to determine a similarity in material between the laundry information and the laundry data,
    when the laundry information matches with the laundry data based on the similarity in material, extract the laundry course corresponding to the matched laundry data, and
    when the laundry information does not match the laundry data based on the similarity in material, infer, using a convolutional neural network (CNN) the laundry information of the at least one laundry item distributed on the plurality of regions and extract a pre-learned laundry course corresponding to the inferred laundry information.

2. The AI-based laundry course recommendation apparatus of claim 1, wherein the detector further includes:
    a camera configured to photograph the plurality of regions of the at least one laundry item at a plurality of angles, respectively; and
    a light configured to provide a light source to acquire the image during photograph of the camera.

3. The AI-based laundry course recommendation apparatus of claim 2, wherein the light is installed on an upper portion of the washing machine to maintain predetermined illumination in the laundry distributed on the plurality of regions, and is operated while the detector acquires the image.

4. The AI-based laundry course recommendation apparatus of claim 1, wherein the processor is further configured to: extract at least one laundry course to be applied to the laundry information, apply a score to suitability of the laundry information and the at least one laundry course, and extract a laundry course with a highest score.

5. The AI-based laundry course recommendation apparatus of claim 4, wherein the processor is further configured to: exclude a laundry course set by the user to not to be applied to the laundry when the processor extracts the laundry course with the highest score.

6. The AI-based laundry course recommendation apparatus of claim 5, wherein the processor is further configured to: output a notification when all laundry courses are excluded.

7. The AI-based laundry course recommendation apparatus of claim 1, further comprising a memory configured to store a laundry data recognition model that is trained using a machine learning or deep learning algorithm and is used to recognize the laundry information from the at least one image.

8. The AI-based laundry course recommendation apparatus of claim 1, wherein the processor further includes a controller configured to control the washing machine according to any one of a laundry course that is manually input by the user or a laundry course that is automatically extracted.

9. A control method of an artificial intelligence (AI)-based laundry course recommendation apparatus, the method comprising:
    a first operation of classifying at least one laundry item inside a washing machine into a plurality of regions and photographing the plurality of regions at a plurality of angles, respectively, to acquire at least one image related to a type and a material of the at least one laundry item;
    a second operation of acquiring laundry information on the type and material of the laundry from the image and storing the laundry information in a database; and
    a third operation of comparing a plurality of pieces of laundry information corresponding to the plurality of regions, which is stored in the database, with laundry data and laundry course pre-input by a user, and extracting a laundry course of the at least one laundry item, wherein the third operation further comprises:
    classifying the laundry information distributed on the plurality of regions;
    comparing the laundry information with the laundry data to determine a similarity in material between the laundry information and the laundry data; and
    when the laundry information matches with the laundry data based on the similarity in material, extracting the laundry course corresponding to the matched laundry data, and
    when the laundry information does not match the laundry data based on the similarity in material, inferring, using a convolutional neural network (CNN) the laundry information of the at least one laundry item distributed on the plurality of regions and extract a pre-learned laundry course corresponding to the inferred laundry information.

10. The method of claim 9, wherein the first operation includes receiving at least one still image or video image indicating the type and material of the laundry from the user or a mobile device of the user.

11. The method of claim 9, wherein the second operation includes:
    classifying the laundry into the plurality of regions;
    generating laundry information by matching with a type and a material corresponding to the plurality of regions; and
    storing a result in the database by matching the laundry and the laundry information corresponding to the plurality of regions.

12. The method of claim 9, wherein the third operation includes:
    extracting at least one laundry course to be applied to the laundry information;
    applying a score to suitability of the laundry information and the at least one laundry course; and
    extracting a laundry course with a highest score.

13. The method of claim 12, further comprising: excluding a laundry course set by the user to not to be applied to the laundry.

14. The method of claim 13, further comprising outputting a notification to the user when all laundry courses are excluded.

15. The method of claim 9, further comprising controlling the washing machine according to any one of a laundry course that is manually input by the user or a laundry course that is automatically extracted.

* * * * *